United States Patent
Oshita et al.

(10) Patent No.: US 12,240,459 B2
(45) Date of Patent: Mar. 4, 2025

(54) DRIVING ASSISTANCE METHOD AND DRIVING ASSISTANCE DEVICE

(71) Applicant: Isuzu Motors Limited, Tokyo (JP)

(72) Inventors: Wasantha Oshita, Fujisawa (JP); Masaichi Takahashi, Fujisawa (JP); Shinichiro Fukazawa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 269 days.

(21) Appl. No.: 17/801,537

(22) PCT Filed: Feb. 26, 2021

(86) PCT No.: PCT/JP2021/007295
§ 371 (c)(1),
(2) Date: Aug. 23, 2022

(87) PCT Pub. No.: WO2021/172502
PCT Pub. Date: Sep. 2, 2021

(65) Prior Publication Data
US 2023/0331228 A1    Oct. 19, 2023

(30) Foreign Application Priority Data
Feb. 28, 2020    (JP) ................... 2020-034395

(51) Int. Cl.
*B60W 30/18*    (2012.01)
*B60W 10/04*    (2006.01)
*B60W 10/18*    (2012.01)

(52) U.S. Cl.
CPC .......... *B60W 30/181* (2013.01); *B60W 10/04* (2013.01); *B60W 10/18* (2013.01); *B60W 2510/0208* (2013.01); *B60W 2520/10* (2013.01); *B60W 2554/802* (2020.02); *B60W 2710/18* (2013.01); *B60W 2720/106* (2013.01)

(58) Field of Classification Search
CPC .... B60W 30/181; B60W 10/04; B60W 10/18; B60W 2510/0208; B60W 2520/10; B60W 2554/802; B60W 2710/18; B60W 2720/106
USPC .......................................................... 701/96
See application file for complete search history.

(56) References Cited

U.S. PATENT DOCUMENTS

2020/0114916 A1*   4/2020  Oguro ................... B60W 30/08
2020/0398838 A1   12/2020  Oguro et al.

FOREIGN PATENT DOCUMENTS

| | | | |
|---|---|---|---|
| JP | 07-017295 | | 1/1995 |
| JP | 2010120503 A | * | 6/2010 |
| JP | 2012-121405 | | 6/2012 |
| JP | 2014-161797 | | 8/2014 |
| JP | 2014151797 A | * | 8/2014 |
| JP | 2017065589 A | * | 4/2017 |
| WO | WO 2018/066024 | | 4/2018 |
| WO | WO 2019/003302 | | 1/2019 |

* cited by examiner

Primary Examiner — Isaac G Smith

(57) ABSTRACT

The present invention pertains to driving assistance method and device by which an automobile can be parked at a location near a target parking location when carrying out ACC. During deceleration control via ACC, when a predicted parking location is closer than a target parking location by at least a prescribed threshold value, a parking location is adjusted by causing a state change from a first state, in which deceleration control is carried out, to a second state, in which acceleration control is carried out.

7 Claims, 6 Drawing Sheets

DRIVING ASSISTANCE METHOD AND DRIVING ASSISTANCE DEVICE

TECHNICAL FIELD

The present disclosure relates to a driving assistance method of assisting the driving of a vehicle and a driving assistance apparatus that assists the driving of the vehicle.

BACKGROUND ART

In recent years, as one technology of assisting the driving of a vehicle, adaptive cruise control (hereinafter referred to as "ACC") has been gathering attention (for example, see Patent Literature (hereinafter, referred to as PTL 1)). The ACC is a technology of obtaining the vehicle speed of a vehicle, the relative speed of a leading vehicle with respect to the vehicle, the inter-vehicle distance between the vehicle and the leading vehicle, and the like, and controlling a driving system and a braking system of the vehicle such that the vehicle speed and the inter-vehicle distance between the vehicle and the leading vehicle are maintained to be constant.

In the ACC, in general, cruise control that controls the speed of own car to a set vehicle speed that is preset is performed when there are no leading cars.

CITATION LIST

Patent Literature

PTL 1
Japanese Patent Application Laid-Open No. HEI 7-17295

SUMMARY OF INVENTION

Technical Problem

The ACC of the related art is not actuated at 40 km/h or less, for example. However, a recent trend is to actuate the ACC even while the vehicle is stopped. Therefore, there is a need to realize ACC that also takes the stoppage of the vehicle into consideration.

The stopping control of the vehicle performed by a driving assistance apparatus is realized by outputting a target deceleration speed to a brake ECU from the driving assistance apparatus and generating a brake force in accordance with the target deceleration speed. However, due to the nature of brakes, it is extremely difficult to cause the actual deceleration speed to be the same as the target deceleration speed output from the driving assistance apparatus. As a result, it has been difficult to accurately stop the vehicle at a target vehicle-stopping position.

The present disclosure has been made in view of the abovementioned point and provides a driving assistance method and a driving assistance apparatus capable of stopping own vehicle at a position close to a target vehicle-stopping position when ACC is performed.

Solution to Problem

One aspect of the present disclosure is a driving assistance method of assisting driving of a vehicle, the driving assistance method comprising:
decelerating the vehicle; and
adjusting a vehicle-stopping position by causing a state to transition from a first state in which deceleration control is performed to a second state in which acceleration control is performed, when a predicted vehicle-stopping position is behind a target vehicle-stopping position by a predetermined threshold value or more.

One aspect of the present disclosure is a driving assistance apparatus that assists driving of a vehicle, the driving assistance apparatus comprising:
a determination section that determines whether a predicted vehicle-stopping position is behind a target vehicle-stopping position by a predetermined threshold value or more; and
a vehicle-stopping-position adjustment section that adjusts a vehicle-stopping position by causing a state to transition from a first state in which deceleration control is performed to a second state in which acceleration control is performed, when the predicted vehicle-stopping position is behind the target vehicle-stopping position by the predetermined threshold value or more.

Advantageous Effects of Invention

According to the present disclosure, it is possible to stop the own vehicle at the position close to the target vehicle-stopping position when the ACC is performed.

BRIEF DESCRIPTION OF DRAWINGS

FIGS. 4A and 4B illustrate a state until the own vehicle stops by performing deceleration control in which FIG. 4A illustrates the relationship between the own vehicle and the other vehicle until the own vehicle stops and FIG. 4B is a graph showing the relationship between the travel distance and the own car speed from when vehicle-stopping control is started to when the vehicle stops;

DESCRIPTION OF EMBODIMENTS

One embodiment of the present invention is described in detail below with reference to the accompanying drawings.
<1> Configuration of Vehicle First, the configuration of a vehicle including a driving assistance apparatus according to one embodiment of the present disclosure is described.

Figure 1:
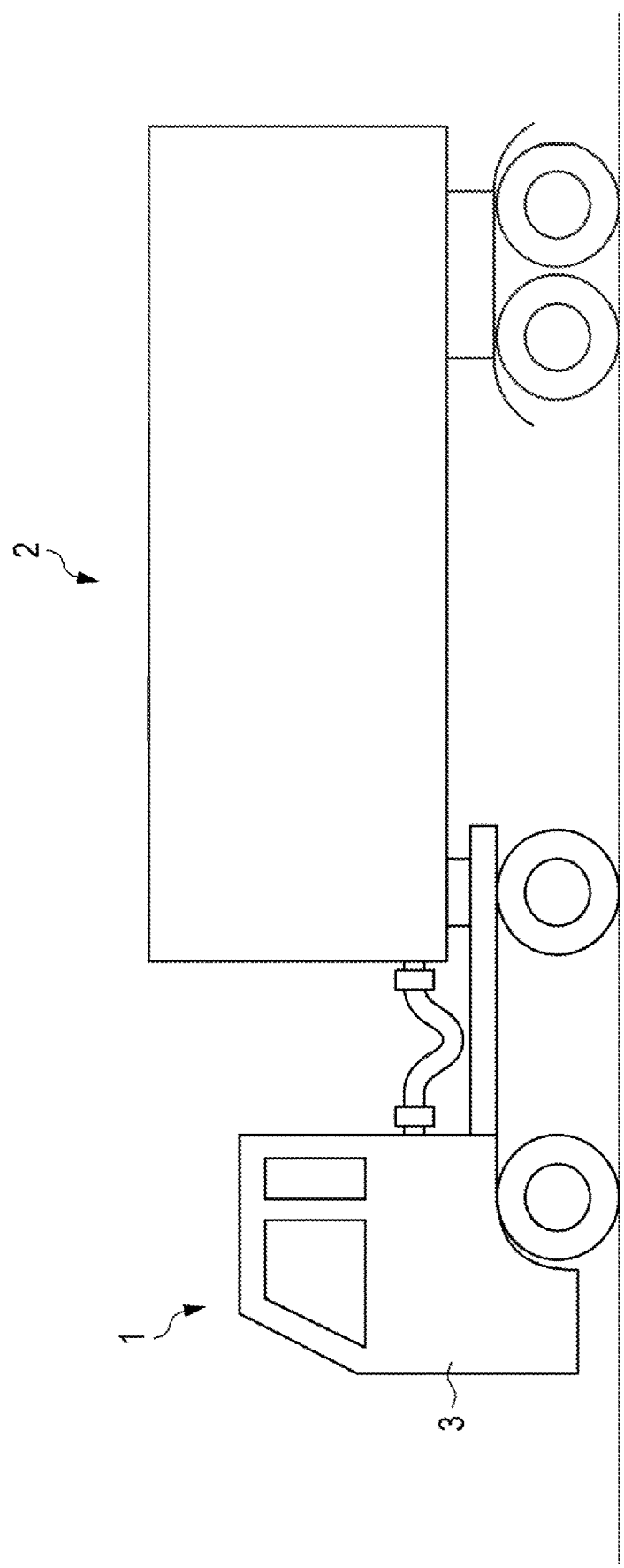
FIG. 1 is an external view illustrating an example of a vehicle to which a driving assistance apparatus according to an embodiment is applied.
Figure 2:
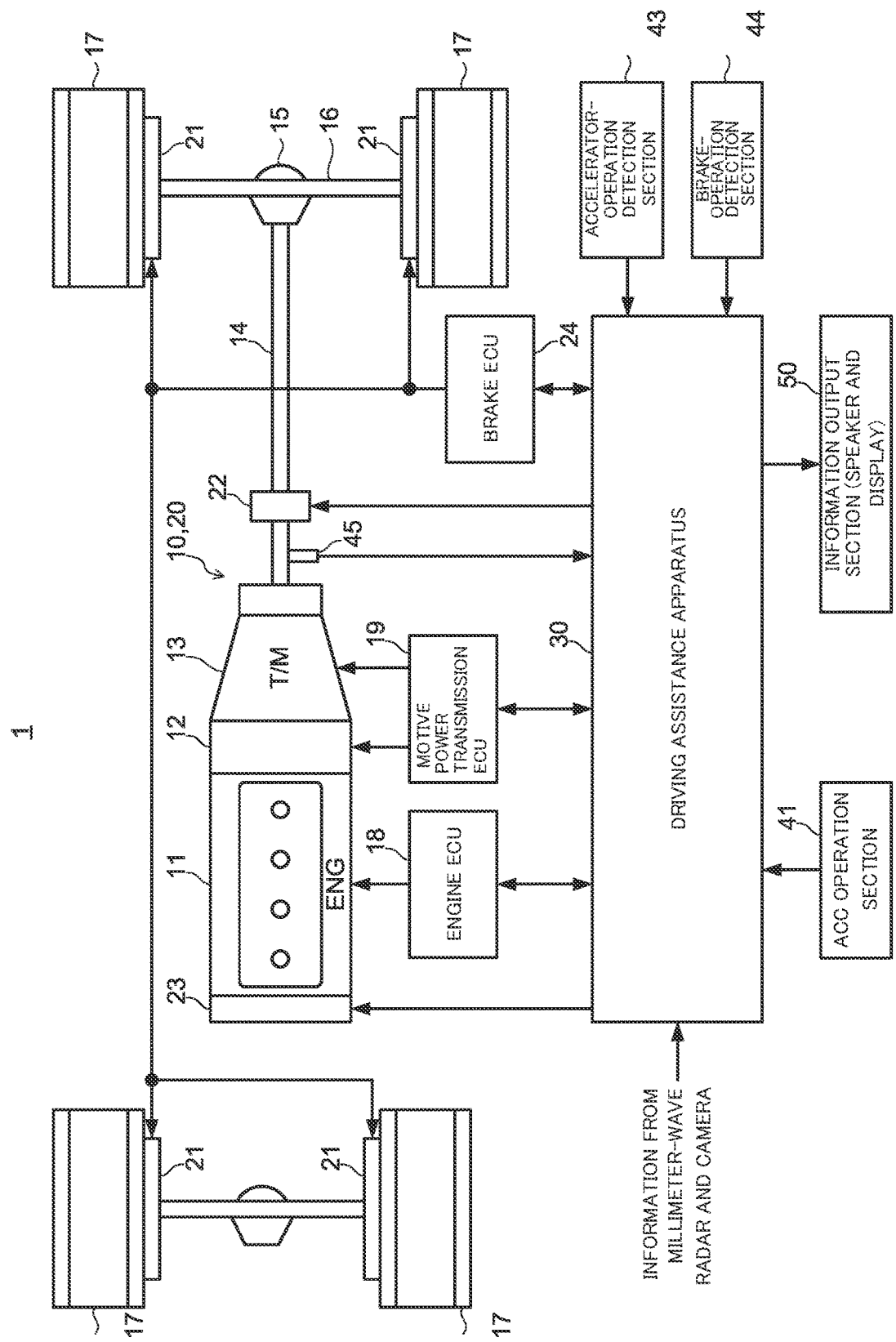
FIG. 2 is a block diagram illustrating the configuration of the vehicle of the embodiment.

FIG. 1 is an external view illustrating an example of vehicle 1 to which a driving assistance apparatus according to the present embodiment is applied. FIG. 2 is a block diagram illustrating the configuration of vehicle 1. Illustration and description are made by focusing on parts relating to the driving assistance apparatus.

As illustrated in FIG. 1, vehicle 1 is a tractor (traction vehicle) capable of towing trailer 2 as a result of coupling trailer 2 to the tractor. Vehicle 1 has vehicle main-body portion 3 including a power system such as an engine and driving wheels and a driver's seat, and trailer 2 coupled to vehicle main-body portion 3.

As illustrated in FIG. 2, vehicle 1 has driving system 10 that causes vehicle 1 to travel, braking system 20 that decelerates vehicle 1, driving assistance apparatus 30 that assists the driving of vehicle 1 by a driver, and the like.

Driving system 10 has engine 11, clutch 12, transmission 13, propeller shaft 14, differential gear 15, drive shaft 16, wheels 17, engine ECU 18, and motive power transmission ECU 19.

Engine ECU 18 and motive power transmission ECU 19 are connected to driving assistance apparatus 30 by an in-vehicle network such as a controller area network (CAN) and are able to transmit and receive necessary data and control signals to and from each other. Engine ECU 18 controls the output of engine 11 in accordance with a drive command from driving assistance apparatus 30. Motive power transmission ECU 19 controls the connection and disconnection of clutch 12 and the speed change of transmission 13 in accordance with a drive command from driving assistance apparatus 30.

The motive power of engine 11 is transmitted to transmission 13 via clutch 12. The motive power transmitted to transmission 13 is further transmitted to wheels 17 via propeller shaft 14, differential gear 15, and drive shaft 16. As a result, the motive power of engine 11 is transmitted to wheels 17, and vehicle 1 travels.

Braking system 20 has service brakes 21, auxiliary brakes 22, 23, a parking brake (not shown), and brake ECU 24.

Service brake 21 is a brake that is generally referred to as a main brake, a friction brake, a foot brake, a foundation brake, or the like. Service brake 21 is a drum brake that obtains braking force by pressing a brake lining against the inner side of a drum that rotates with wheel 17, for example.

Auxiliary brake 22 is a retarder (hereinafter referred to as "retarder 22") that obtains braking force by directly giving load to the rotation of propeller shaft 14, and is an electromagnetic retarder, for example. Auxiliary brake 23 is an exhaust brake (hereinafter referred to as "exhaust brake 23") that increases an effect of an engine brake with use of rotational resistance of the engine. By providing retarder 22 and exhaust brake 23, the braking force can be increased, and the frequency of usage of service brakes 21 is reduced. Therefore, the wear-out of brake lining and the like can be suppressed.

Brake ECU 24 is connected to driving assistance apparatus 30 by an in-vehicle network such as a CAN and is able to transmit and receive necessary data and control signals to and from each other. Brake ECU 24 controls the braking force of service brakes 21 (the brake fluid pressure of wheel cylinders of wheels 17) in accordance with a braking command from driving assistance apparatus 30.

The braking operation of service brakes 21 is controlled by driving assistance apparatus 30 and brake ECU 24. The braking operation of retarder 22 and exhaust brake 23 is controlled by on/off by driving assistance apparatus 30. The braking force of retarder 22 and exhaust brake 23 is substantially fixed. Therefore, when a desired braking force is to be accurately generated, service brakes 21 that can fine-adjust the braking force are suitable.

Information from a millimeter-wave radar and a camera is input to driving assistance apparatus 30. Information from the millimeter-wave radar and the camera is information indicating the traffic situation and the road situation ahead of the vehicle. Driving assistance apparatus 30 has ACC operation section 41, accelerator-operation detection section 43, brake-operation detection section 44, and the like.

Driving assistance apparatus 30 forms control signals for controlling the operation of driving system 10 and braking system 20. In particular, driving assistance apparatus 30 of the present embodiment obtains target acceleration/deceleration speed for realizing ACC and outputs the target acceleration/deceleration speed to engine ECU 18, motive power transmission ECU 19, and brake ECU 24, as appropriate.

Although not shown, each of engine ECU 18, motive power transmission ECU 19, brake ECU 24, and driving assistance apparatus 30 has a central processing unit (CPU), a storage medium such as a read only memory (ROM) in which a control program is stored, a working memory such as a random access memory (RAM), and a communication circuit, for example. In this case, for example, the functions of sections described below constituting driving assistance apparatus 30 are realized by executing control programs by the CPU. All or some of engine ECU 18, motive power transmission ECU 19, brake ECU 24, and driving assistance apparatus 30 may be integrated.

ACC operation section 41 includes an ACC ON/OFF switch for performing ON/OFF control of the operation of the ACC. ACC operation section 41 includes setting switches for setting various settings of the ACC. A driver can set a target inter-vehicle distance and a target own-vehicle speed, for example, by operating the setting switches. Those switches may be realized by a user interface displayed on a display with a touch screen.

Accelerator-operation detection section 43 detects the depression amount of an accelerator pedal and outputs the detection result to driving assistance apparatus 30. Driving assistance apparatus 30 transmits drive commands to engine ECU 18 and motive power transmission ECU 19 on the basis of the depression amount of the accelerator pedal.

Brake-operation detection section 44 detects the depression amount of a brake pedal for operating service brakes 21. Brake-operation detection section 44 detects whether an auxiliary brake lever that causes retarder 22 or exhaust brake 23 to operate has been operated. Brake-operation detection section 44 outputs the detection result relating to the brake pedal and the auxiliary brake lever to driving assistance apparatus 30. Driving assistance apparatus 30 transmits a braking command to brake ECU 24 on the basis of the depression amount of the brake pedal. Driving assistance apparatus 30 controls the ON/OFF operation of retarder 22 or exhaust brake 23 on the basis of the operation of the auxiliary brake lever.

Driving assistance apparatus 30 outputs various information relating to traveling from information output section 50. For example, information output section 50 outputs that sound and display, to thereby indicate that the ACC is being executed or the ACC is being stopped.

<2> Deceleration Control at Time of ACC

Next, deceleration control at the time of the ACC according to the present embodiment is described.

Figure 3:
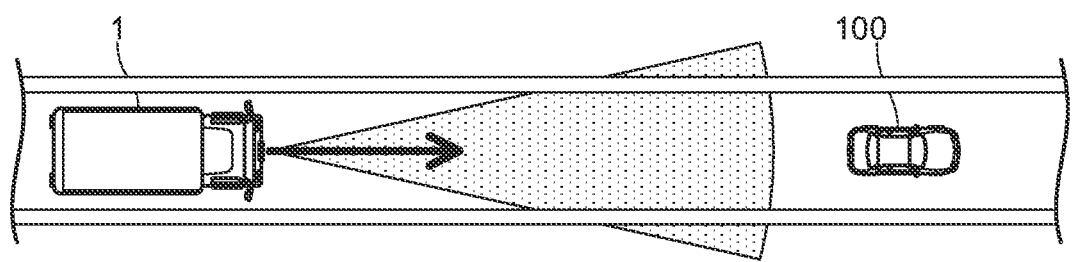
FIG. 3 illustrates a situation where own vehicle during ACC approaches another vehicle that is being stopped.

In the present embodiment, as illustrated in FIG. 3, a situation where own vehicle 1 during the ACC approaches other vehicle 100 that is being stopped is supposed. The shaded pattern in the drawing indicates a detection range by the millimeter-wave radar. As can be seen from the drawing, other vehicle 100 is not a vehicle that own vehicle 1 has been following but is a vehicle that suddenly enters the detection range of the millimeter-wave radar when own vehicle 1 is traveling while the ACC is active.

Figures 4A, 4B:
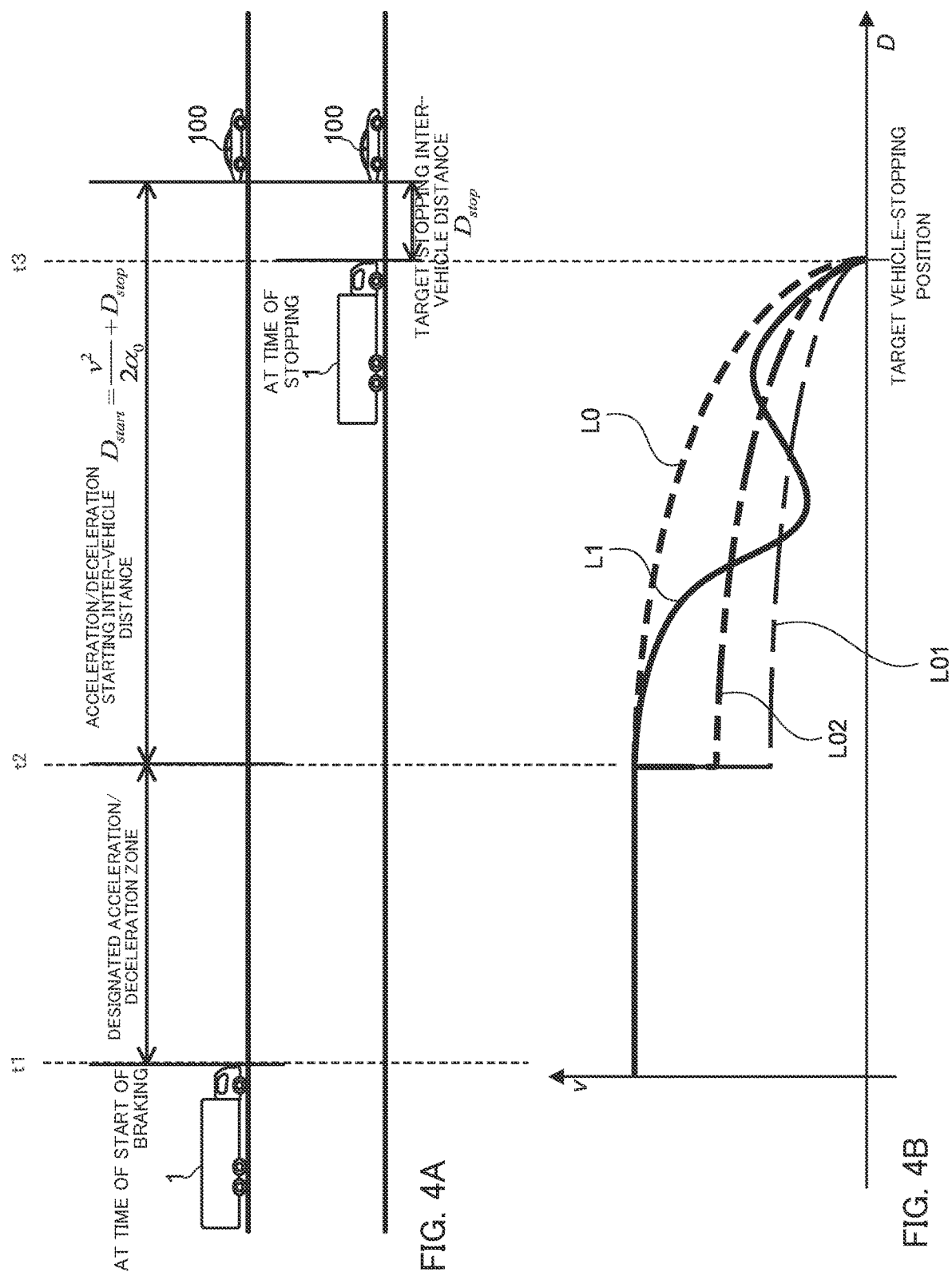

FIGS. 4A and 4B illustrate a state until own vehicle 1 stops by performing deceleration control with respect to such other vehicle 100. FIG. 4A illustrates the relationship between own vehicle 1 and the other vehicle until own vehicle 1 stops and FIG. 4B is a graph showing the relationship between travel distance D and own car speed v from when vehicle-stopping control is started to when the vehicle stops.

Vehicle 1 starts deceleration control at time point t1. In other words, other vehicle 100 has entered the detection range of the millimeter-wave radar at time point t1. A zone from time point t1 to time point t2 is a zone referred to as a designated acceleration/deceleration zone, and vehicle 1 performs traveling at a certain speed or fuel cut in accordance with own vehicle speed v in the zone.

Vehicle 1 eventually outputs basic deceleration speed α0 at time point t2 at which inter-vehicle distance Dstart at which acceleration/deceleration is to be started is reached. Inter-vehicle distance Dstart can be expressed by the following expression, where a target stopping inter-vehicle distance is represented by Dstop, the own vehicle speed is represented by v, and the basic deceleration speed is represented by α0.

$$D\text{start}=(v^2)/(2\alpha 0)+D\text{stop} \quad \text{(Expression 1)}$$

Thus, as indicated by dotted line L0 in FIG. 4B, own vehicle speed v becomes smaller as travel distance D becomes greater, and own vehicle speed v is supposed to reach 0 at time point t3 when target stopping inter-vehicle distance Dstop is reached. Dotted line L0 indicates the relationship between target speed v and travel distance D when deceleration is performed at basic deceleration speed α0.

However, due to the nature of the brakes, the actual deceleration speed is not necessarily the same as basic deceleration speed α0. In general, at the time when the brakes start to work, the actual deceleration speed becomes smaller than basic deceleration speed α0 (in other words, becomes a great deceleration).

As a result, when the ACC control of the related art is performed, the relationship between actual travel distance D and own vehicle speed v does not become the relationship indicated by dotted line L0 in FIG. 4B, and the deceleration speed becomes smaller (becomes a rapid deceleration) at the time when the brake starts to work as indicated by solid line L1. Therefore, the relationship significantly departs from dotted line L0. When the deceleration is continued in this state, vehicle 1 stops at a position greatly behind the target vehicle-stopping position.

In view of the above, driving assistance apparatus 30 of the present embodiment performs vehicle-stopping-position adjustment control.

<3> Configuration and Operation of Driving Assistance Apparatus of Embodiment

Figure 5:
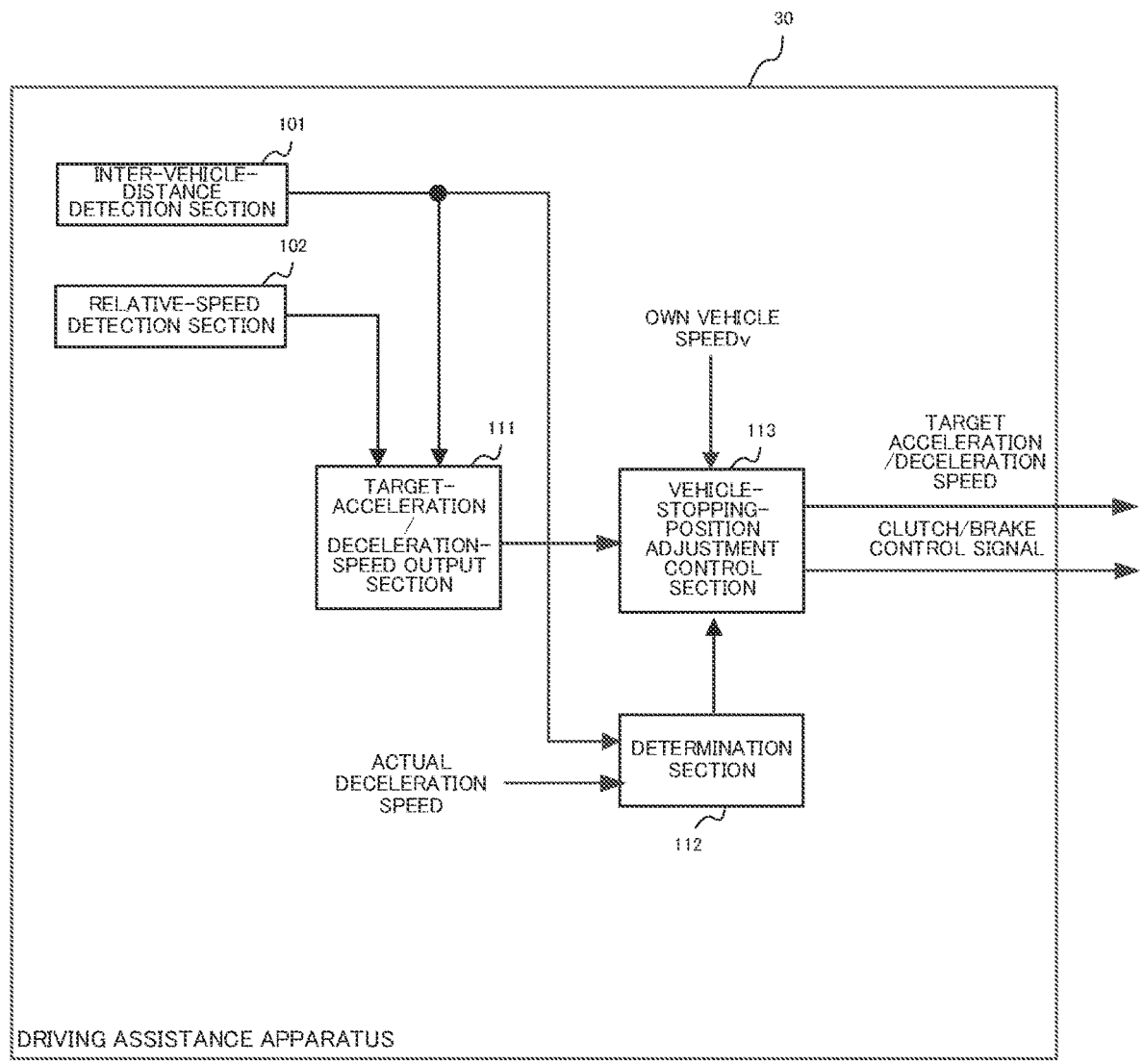
FIG. 5 is a block diagram illustrating the configuration of the driving assistance apparatus according to the embodiment.

FIG. 5 is a block diagram illustrating the configuration of driving assistance apparatus 30 of the present embodiment.

Driving assistance apparatus 30 has inter-vehicle-distance detection section 101, relative-speed detection section 102, target-acceleration/deceleration-speed output section 111, determination section 112, and vehicle-stopping-position adjustment control section 113.

Inter-vehicle-distance detection section 101 and relative-speed detection section 102 respectively measure (detect) the inter-vehicle distance and the relative speed between own vehicle 1 and a leading car on the basis of information obtained by the millimeter-wave radar, the camera, and the like, and output the measurement results to target-acceleration/deceleration-speed output section 111. Inter-vehicle-distance detection section 101 and relative-speed detection section 102 may measure inter-vehicle distance and the relative speed on the basis of information from other sensors such as a laser radar.

Target-acceleration/deceleration-speed output section 111 outputs the target acceleration/deceleration speed for causing own car to follow the leading car on the basis of the inter-vehicle distance and the relative speed between the own car and the leading car. As a result, automatic following traveling control is realized. When there are no leading cars, target-acceleration/deceleration-speed output section 111 outputs a target acceleration speed for causing the speed of the own car to be a set certain speed. As a result, constant-speed traveling control is realized.

Automatic-following traveling control is control that operates driving system 10 and braking system 20 such that the inter-vehicle distance is within a predetermined target range and the relative speed approaches zero when a leading vehicle is present in a predetermined range. The constant-speed traveling control is control that operates driving system 10 and braking system 20 such that the traveling speed of vehicle 1 approaches a predetermined target value when there are no leading vehicles in a predetermined range.

Target-acceleration/deceleration-speed output section 111 performs the vehicle-stopping control as that illustrated in FIG. 4A when other vehicle 100 that is being stopped is present ahead. The features of the present embodiment are mainly in parts relating to the vehicle-stopping control. Therefore, configurations and operations relating to the vehicle-stopping control are mainly described below.

Target-acceleration/deceleration-speed output section 111 of the present embodiment calculates basic deceleration speed α0 with use of expression 1 described above, and outputs basic deceleration speed α0. In expression 1, preset values only need to be used as acceleration/deceleration starting inter-vehicle distance Dstart and target stopping inter-vehicle distance Dstop, and an output of a vehicle speed sensor (not shown) only needs to be used as own vehicle speed v.

Determination section 112 determines whether a predicted vehicle-stopping position is behind the target vehicle-stopping position by a predetermined threshold value or more. Information on the inter-vehicle distance from inter-vehicle-distance detection section 101 and information on the actual deceleration speed are input to determination section 112, which performs determination on the basis of the above. In other words, when the current inter-vehicle distance and deceleration speed are understood, the distance from the leading car at which the vehicle can be stopped can be calculated. Therefore, when a value obtained by comparing the calculation result with target stopping inter-vehicle distance Dstop is equal to or more than a predetermined threshold value, it can be determined that the predicted vehicle-stopping position is behind the target vehicle-stopping position by the predetermined threshold value or more. The actual deceleration speed of own car can be measured by a millimeter-wave radar or an acceleration speed sensor, for example. Determination section 112 outputs the determination result to vehicle-stopping-position adjustment control section 113. Determination section 112 may naturally determine whether the predicted vehicle-stopping position is behind the target vehicle-stopping position by a predetermined threshold value or more by another method.

Vehicle-stopping-position adjustment control section 113 adjusts the vehicle-stopping position by causing the state to transition from a first state in which the deceleration control is performed to a second state in which the acceleration control is performed when the predicted vehicle-stopping position is behind the target vehicle-stopping position by a predetermined threshold value or more.

In other words, in cases where vehicle 1 is to stop at a position greatly behind the target vehicle-stopping position when deceleration is continued in this state as indicated by solid line L1 in FIG. 4B, the vehicle-stopping position is adjusted by causing the state to transition from the deceleration control to the acceleration control.

In the present embodiment, when the clutch is disconnected when the state transition is to be performed, a brake instruction is maintained until the clutch is in a half-joined or joined state. When the clutch is connected, the brake instruction is removed and the acceleration is performed.

As above, by maintaining the brake without releasing the brake until the clutch becomes half-joined when the acceleration is performed, vehicle 1 can be prevented from sliding down even when there is a gradient on a road, for example.

In the case of the present embodiment, when acceleration is performed from the state of deceleration, the output of the engine is not raised (in other words, acceleration is prevented) until the clutch is half-joined when the clutch is disconnected (in other words, a situation in which the motive power of the engine is not transmitted to the wheels).

The acceleration control virtually cannot be performed unless own vehicle speed v is equal to or less than a predetermined value, and hence the state transition from the deceleration control to the acceleration control is performed when own vehicle speed v is equal to or less than a predetermined value.

In the present embodiment, curves LO1, LO2 obtained by multiplying dotted line L0 indicating the relationship between target speed v and travel distance D when deceleration is performed at basic deceleration speed $\alpha 0$ by coefficients less than 1 are prepared, and vehicle-stopping-position adjustment control section 113 determines the timing of starting the acceleration and the timing of ending the acceleration with use of curves LO1, LO2.

Specifically, vehicle-stopping-position adjustment control section 113 outputs an acceleration instruction when speed v becomes equal to or less than curve LO1 on an actual distance-speed curve indicated by solid line L1, and then ends the acceleration instruction and outputs the deceleration instruction when speed v becomes equal to or more than curve LO2.

Figure 6:
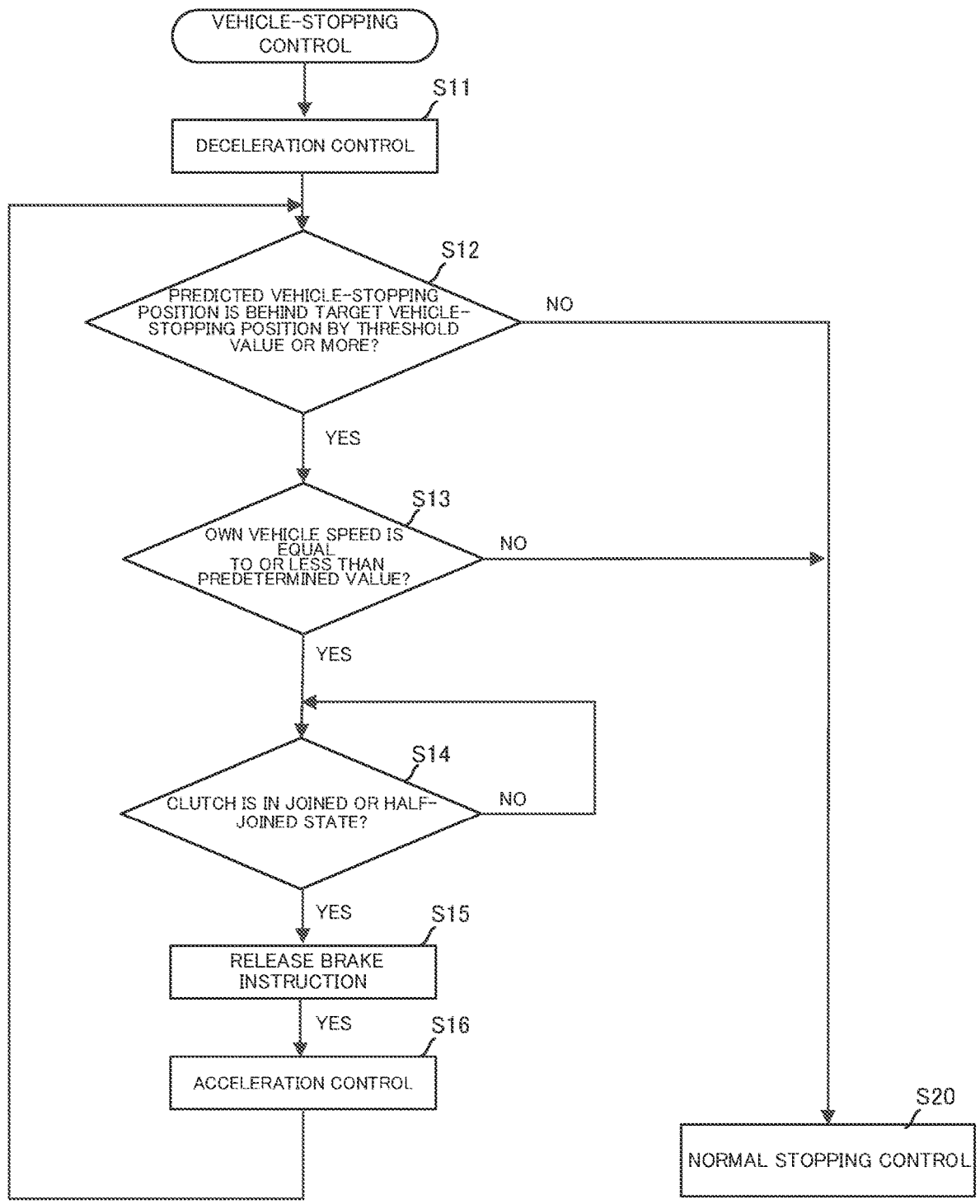
FIG. 6 is a flowchart provided for the description of the operation of the driving assistance apparatus.

FIG. 6 is a flowchart illustrating the operation of the present embodiment. Driving assistance apparatus 30 performs deceleration control in Step S11 when driving assistance apparatus 30 detects stopping vehicle 100 ahead and starts the vehicle-stopping control. In other words, the target deceleration speed for stopping own vehicle 1 at the target vehicle-stopping position is output from target-acceleration/deceleration-speed output section 111. The target deceleration speed is transmitted to brake ECU 24 via vehicle-stopping-position adjustment control section 113.

In following Step S12, it is determined by determination section 112 whether the predicted vehicle-stopping position is behind the target vehicle-stopping position by a threshold value or more. When a negative result is obtained in Step S12, it means that own vehicle 1 can stop at a position close to the target vehicle-stopping position even when the deceleration at target deceleration speed $\alpha 0$ is continued in this state. Therefore, the processing transitions to Step S20 and continues the deceleration using target deceleration speed $\alpha 0$ output from target-acceleration/deceleration-speed output section 111.

Meanwhile, when an affirmative result is obtained in Step S12, it means that own vehicle 1 stops considerably behind the target vehicle-stopping position when the deceleration continues at target deceleration speed $\alpha 0$ in this state.

Therefore, when an affirmative result is obtained in Step S12, vehicle-stopping-position adjustment control section 113 first waits until own vehicle speed v becomes equal to or less than a predetermined value in Step S13. Then, when own vehicle speed v becomes equal to or less than a predetermined value, the processing transitions to Step S14.

In Step S14, vehicle-stopping-position adjustment control section 113 controls the clutch to be joined or half-coupled (half-clutch) and waits while maintaining the brake instruction (in other words, in a state in which the brake is working) until the clutch is joined or half-coupled (half-clutch).

When the clutch is joined or half-coupled (half-clutch), the processing transitions from Step S14 to Step S15, vehicle-stopping-position adjustment control section 113 removes the brake instruction, and vehicle-stopping-position adjustment control section 113 performs the acceleration control in following Step S16.

<4> Effects of Embodiment

As described above, according to the present embodiment, by adjusting the vehicle-stopping position by causing the state to transition from the first state in which deceleration control is performed to the second state in which acceleration control is performed when the predicted vehicle-stopping position is behind the target vehicle-stopping position by a predetermined threshold value or more, the own vehicle can be stopped at a position close to the target vehicle-stopping position when the ACC is performed.

By maintaining the brake instruction until the clutch is placed in a half-joined or joined state when the clutch is in a disconnected state when the state transitions and removing the brake instruction and performing the acceleration when the clutch is in a half-joined or joined state when the state transitions, vehicle 1 can be prevented from sliding down even when there is a gradient on the road, for example, when the acceleration is performed.

In other words, when the acceleration instruction is output, the clutch transitions from a disconnected state to a connected state. At this time, the driving force is removed with respect to the wheels. Therefore, in the present embodiment, a brake instruction is maintained until the clutch is placed in a half-joined state.

The abovementioned embodiment is merely an example of a realization for carrying out the present invention, and the interpretation of the technical scope of the present invention is not to be limited by those embodiments. In other words, the present invention can be carried out in various forms without departing from the gist or the main features of the present invention.

In the present embodiment, a case where vehicle 1 to which the driving assistance apparatus of the present invention is applied is a tractor capable of towing trailer 2 as a result of coupling trailer 2 to the tractor is described. However, the vehicle to which the present invention is applicable is not limited thereto and may be a vehicle such as a passenger car.

The present application is based on Japanese Patent Application (Japanese Patent Application No. 2020-034395 filed on Feb. 28, 2020, the entire content of which is incorporated herein by reference.

INDUSTRIAL APPLICABILITY

The driving assistance apparatus of the present disclosure is suitable for use in a driving assistance method and a driving assistance apparatus capable of stopping own vehicle at a position close to a target vehicle-stopping position when ACC is performed.

REFERENCE SIGNS LIST

1 Vehicle
2 Trailer
3 Vehicle main-body portion
10 Driving system
11 Engine
12 Clutch
13 Transmission
14 Propeller shaft
15 Differential gear
16 Drive shaft
17 Wheel
18 Engine ECU
19 Motive power transmission ECU
20 Braking system
21 Service brake
22 Retarder
23 Exhaust brake
24 Brake ECU
30 Driving assistance apparatus
101 Inter-vehicle-distance detection section
102 Relative-speed detection section
111 Target-acceleration/deceleration-speed output section
112 Determination section
113 Vehicle-stopping-position adjustment control section

The invention claimed is:

1. A driving assistance method for controlling operations of a driving system and a braking system of a vehicle, the driving assistance method comprising:
decelerating the vehicle;
adjusting a vehicle-stopping position by causing a state to transition from a first state in which deceleration control is performed to a second state in which acceleration control is performed, when a predicted vehicle-stopping position is behind a target vehicle-stopping position by a predetermined threshold value or more; and
maintaining a brake instruction until a clutch provided in a transmitting path engine power to a wheel is placed in a half-joined or joined state, in a case where the clutch is disconnected when the state transition from the first state to the second state is performed.

2. The driving assistance method according to claim 1, further comprising removing a brake instruction and performing acceleration, in a case where the clutch is placed in a half-joined or joined state when the state transition from the first state to the second state is performed.

3. The driving assistance method according to claim 1, further comprising performing the transition from the first state to the second state when an own vehicle speed becomes equal to or less than a predetermined value.

4. The driving assistance method according to claim 1, further comprising ending the acceleration control when an own vehicle speed becomes equal to or more than a predetermined value and then performing the deceleration control.

5. A driving assistance apparatus that assists driving of a vehicle, the driving assistance apparatus comprising a processor configured to:
determine whether a predicted vehicle-stopping position is behind a target vehicle-stopping position by a predetermined threshold value or more;
adjust a vehicle-stopping position by causing a state to transition from a first state in which deceleration control is performed to a second state in which acceleration control is performed, when the predicted vehicle-stopping position is behind the target vehicle-stopping position by the predetermined threshold value or more; and
maintain a brake instruction until a clutch provided in a transmitting path engine power to a wheel is placed in a half-joined or joined state, in a case where the clutch is disconnected when the state transition from the first state to the second state is performed.

6. The driving assistance apparatus according to claim 5, wherein the processor is configured to remove a brake instruction and perform acceleration, in a case where the clutch is placed in a half-joined or joined state when the state transition from the first state to the second state is performed.

7. The driving assistance apparatus according to claim 5, wherein the processor is configured to end acceleration control and to start deceleration control, when an own vehicle speed becomes equal to or greater than a predetermined threshold value.

* * * * *